United States Patent [19]
Rao

[11] Patent Number: 6,133,659
[45] Date of Patent: Oct. 17, 2000

[54] VEHICLE IN-LINE GENERATOR

[75] Inventor: Shekar Rao, Appleton, Wis.

[73] Assignee: Synchrotek, Inc., Appleton, Wis.

[21] Appl. No.: 09/277,109

[22] Filed: Mar. 26, 1999

[51] Int. Cl.[7] .............. H02K 5/00; H02K 7/20; B60K 1/00; F02N 11/04; F02B 43/08

[52] U.S. Cl. .......... 310/89; 310/54; 310/67 R; 310/91; 310/112; 310/114; 310/64; 310/57; 310/270; 180/65.4; 290/46; 123/3

[58] Field of Search ................. 310/52, 54, 66, 310/67 R, 75 R, 89, 91, 101, 102 R, 112, 113, 114, 118, 64, 65, 57, 58, 59, 60 A, 270; 180/65.2, 65.4; 290/46; 123/3, 41.1

[56] References Cited

U.S. PATENT DOCUMENTS

| | | | |
|---|---|---|---|
| 2,831,662 | 4/1958 | Hirsch | 257/250 |
| 2,862,120 | 11/1958 | Onsrud | 310/54 |
| 2,915,656 | 12/1959 | Schwan | 310/57 |
| 2,964,659 | 12/1960 | Steele et al. | 310/54 |
| 4,262,224 | 4/1981 | Kofink et al. | 310/54 |
| 4,346,773 | 8/1982 | Hofbauer et al. | 180/165 |
| 4,405,031 | 9/1983 | Rotter | 180/165 |
| 4,416,360 | 11/1983 | Fiala | 192/0.076 |
| 4,421,998 | 12/1983 | Ahner et al. | 310/68 R |
| 4,430,589 | 2/1984 | Sakuyama et al. | 310/270 |
| 4,734,590 | 3/1988 | Fluegel | 290/1 C |
| 4,743,776 | 5/1988 | Baehler et al. | 290/31 |
| 4,958,095 | 9/1990 | Uchida et al. | 310/59 |
| 4,961,018 | 10/1990 | Akhter | 310/87 |
| 5,020,491 | 6/1991 | Mashino | 123/192.1 |
| 5,103,127 | 4/1992 | Peter | 310/113 |
| 5,172,006 | 12/1992 | Suzuki et al. | 290/45 |
| 5,400,596 | 3/1995 | Shlien | 60/597 |
| 5,773,904 | 6/1998 | Schiebold et al. | 310/92 |
| 5,796,195 | 8/1998 | Miyakawa | 310/68 B |

*Primary Examiner*—Elvin Enad
*Assistant Examiner*—Dang Dinh Le
*Attorney, Agent, or Firm*—Donald Cayen

[57] ABSTRACT

An in-line generator fits between the engine and transmission of a conventional motor vehicle. The in-line generator comprises an externally cooled housing having a first end that is mounted to the engine in place of the transmission. The transmission is secured to the housing second end in the same manner as the transmission would normally be secured to the engine. One end of a rotor is fastened to the engine crankshaft. A coupling is attached to the rotor second end and to the transmission input shaft. When the engine is operated, the rotor rotates to cooperate with a stator in the housing to produce electric power. The rotor also transmits torque to the transmission to propel the motor vehicle. The coupling includes a flex plate that accommodates thermal expansion of the rotor and other generator parts. The in-line generator can be removed from the vehicle and the transmission resecured to the engine as in a normal vehicle should the in-line generator require repair. Alternately, a dummy generator can be installed in place of the in-line generator.

13 Claims, 3 Drawing Sheets

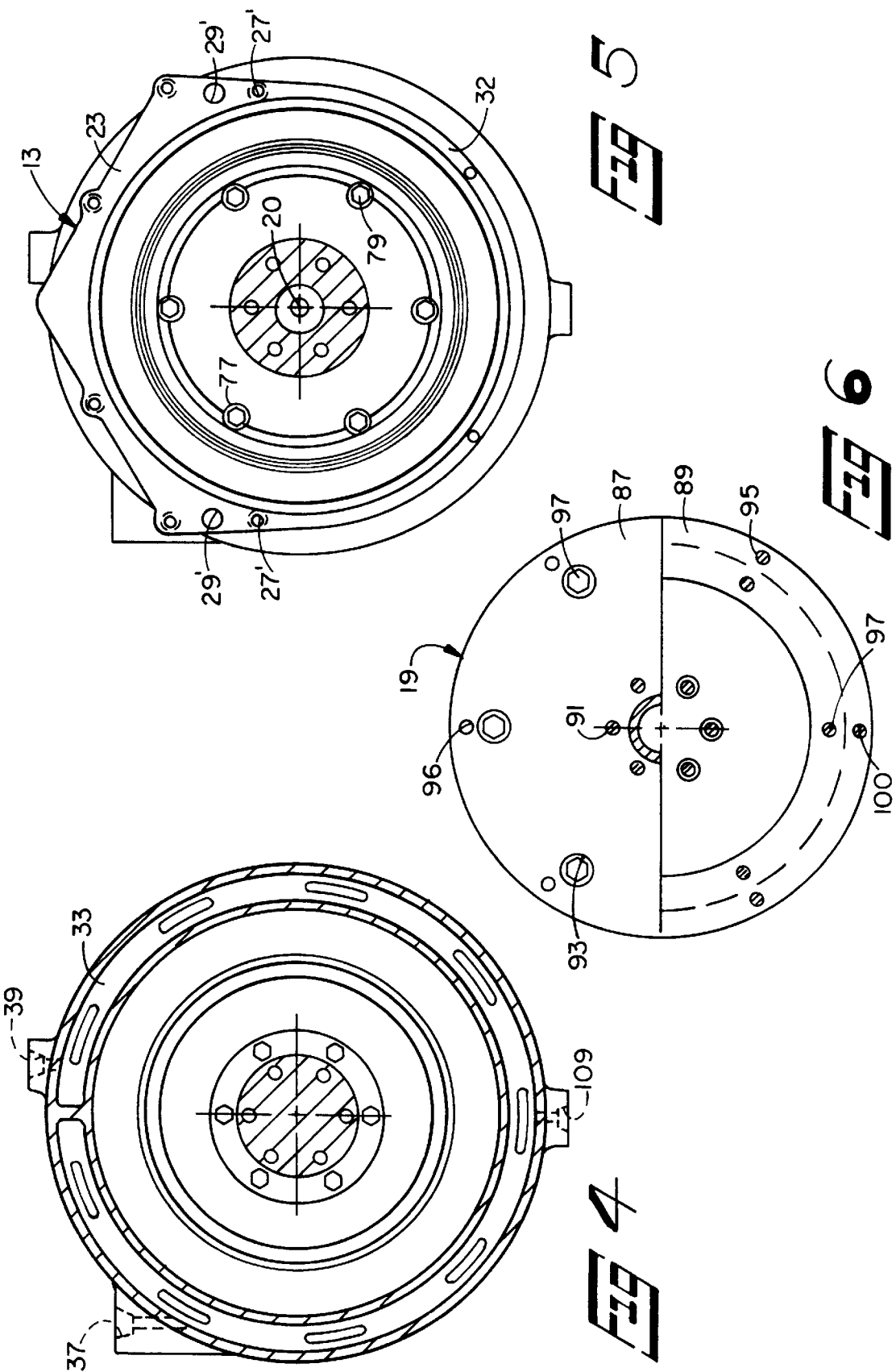

VEHICLE IN-LINE GENERATOR

Background of the Invention

1. Field of the Invention

This invention pertains to producing electricity, and more particularly to apparatus that utilizes the engine of a motor vehicle to produce electric power.

2. Description of the Prior Art

It is well known to employ a motor vehicle engine to produce electric power. For example, generators and alternators driven by belts connected to motor vehicle engines are in widespread use. The electric power is used for lighting, heating, and operational purposes throughout the vehicle.

Although prior engine-driven electric systems are highly developed, they invariably produce only enough power for the vehicle itself. Consequently, when electric power is required at a site that is not connected to a central source, an auxiliary power supply independent of a motor vehicle at the site is required. Auxiliary power supplies are often in the form of self-contained motor-generator sets. Large auxiliary supplies are usually installed on trailers. A trailer is towed by a motor vehicle to the site, where the auxiliary power supply is set in operation.

The prior practice of using self-contained auxiliary power supplies has several disadvantages. Auxiliary power supplies are expensive to manufacture and maintain. They may be needed only infrequently, so the capital invested in them is not used efficiently. Another drawback is the inherent requirement of a large truck or other vehicle to tow the auxiliary power supply trailer. Consequently, a major piece of capital equipment is pressed into service merely to bring the auxiliary power supply to the site where it is needed.

In addition to the undesirable costs associated with them, large towable auxiliary power supplies also occupy a large space. Maneuvering a trailer at some remote sites can be difficult. The space problem becomes acute when the auxiliary power supply is to be transported long distances, as by airplane. In those situations, the auxiliary power supply occupies valuable cargo space. In fact, in some instances, the auxiliary power supply that is towed by a first vehicle occupies cargo room that could be occupied by a second vehicle.

Thus, a need exists for a large capacity but compact and portable source of electric power.

SUMMARY OF THE INVENTION

In accordance with the present invention, an in-line generator is provided that produces high capacity auxiliary electric power while occupying only minimal space. This is accomplished by installing the generator between the engine and transmission of a motor vehicle.

The in-line generator comprises a housing with a first end that mounts to the vehicle engine block in place of the transmission. The housing contains stator windings. The transmission is secured to the generator housing second end. One end of a shaft with generator rotor windings is fastened to the engine crankshaft. There is a two-piece coupling on a second end of the rotor shaft. The input of the transmission drive train is connected to the coupling. It is a feature of the invention that the rotor shaft is not supported by any bearings.

Operation of the vehicle engine causes the rotor shaft to rotate with the engine crankshaft and produce electric power. That occurs whether or not the transmission is engaged to move the vehicle. When the transmission is engaged, the generator rotor shaft mechanically transmits torque to the transmission simultaneously with generating electric power. The excitation for the generator is applied through an external DC source and can be removed in case of a generator armature short circuit. This prevents any regenerative power being developed by the generator and applied to the vehicle while the vehicle is on the move.

To maximize the versatility of the invention, the generator housing is manufactured such that both the engine and the transmission of the motor vehicle are conventional and require no alterations. In that manner, the generator housing and the transmission are interchangeably mountable to the engine block. Similarly, the transmission is interchangeably securable to the generator housing and to the engine. Should a failure occur in the generator, it can be removed and the transmission resecured directly to the engine block in the manner of a conventional motor vehicle. Alternately, a dummy housing and rotor shaft can be installed in place of the in-line generator. In that case, no alterations to the vehicle drive shaft or transmission supports are required when the in-line generator is removed from the vehicle.

Installation of the in-line generator in a vehicle is straightforward. An important aspect of the invention is that it can be installed from underneath the vehicle. The rotor is fastened to the engine crankshaft. The housing is slid over the rotor and mounted to the engine block. The exciter rotor is assembled onto the rotor shaft. If desired, the same fasteners can be used to join the exciter rotor to the rotor shaft as are used to fasten the rotor shaft to the engine crankshaft. One piece of the coupling is attached to the rotor shaft. The other piece of the coupling is attached to the transmission input shaft. The transmission is secured to the generator housing. Finally, the two pieces of the coupling are joined to each other using an access hole in the transmission.

At the site where electric power is required, the vehicle transmission is disengaged. The engine is controlled, as by a governor, to run at a constant speed to produce electric power at the desired frequency and voltage. It will be realized, of course, that electric power is produced whenever the engine is operating, whether the vehicle is stationary or whether it is moving. Because of the constantly changing engine speed of a moving vehicle, however, the electricity produced is of marginal value without additional circuitry to smooth out the frequency and voltage. If precise power is required while the vehicle is on the move, the variable voltage, variable frequency power from the generator is conditioned by feeding it into an electric power conditioner to obtain precise power at constant voltage and frequency.

The in-line generator of the invention is further distinguished by a cooling system. The generator housing contains coolant passages that connect to a radiator in the motor vehicle. In addition, the generator rotor shaft is designed to act as a heat sink for the rotor windings. Any dimensional changes of the generator components such as the rotor shaft are accommodated by the coupling in a manner that produces minimum stresses on the engine, generator, and transmission.

The method and apparatus of the invention, using a generator that is sandwiched between the engine and transmission of a motor vehicle, thus produces auxiliary electric power at the location of the vehicle. Considerable power can be produced, even through the generator occupies only a small and unobtrusive space in the vehicle.

Other advantages, benefits, and features of the present invention will become apparent to those skilled in the art upon reading the detailed description of the invention.

BRIEF DESCRIPTION OF THE DRAWINGS

FIG. 4 is a cross-sectional view taken along line 4—4 of FIG. 2.

FIG. 5 is a cross-sectional view taken along line 5—5 of FIG. 2.

FIG. 6 is a cross-sectional view taken along line 6—6 of FIG. 2.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
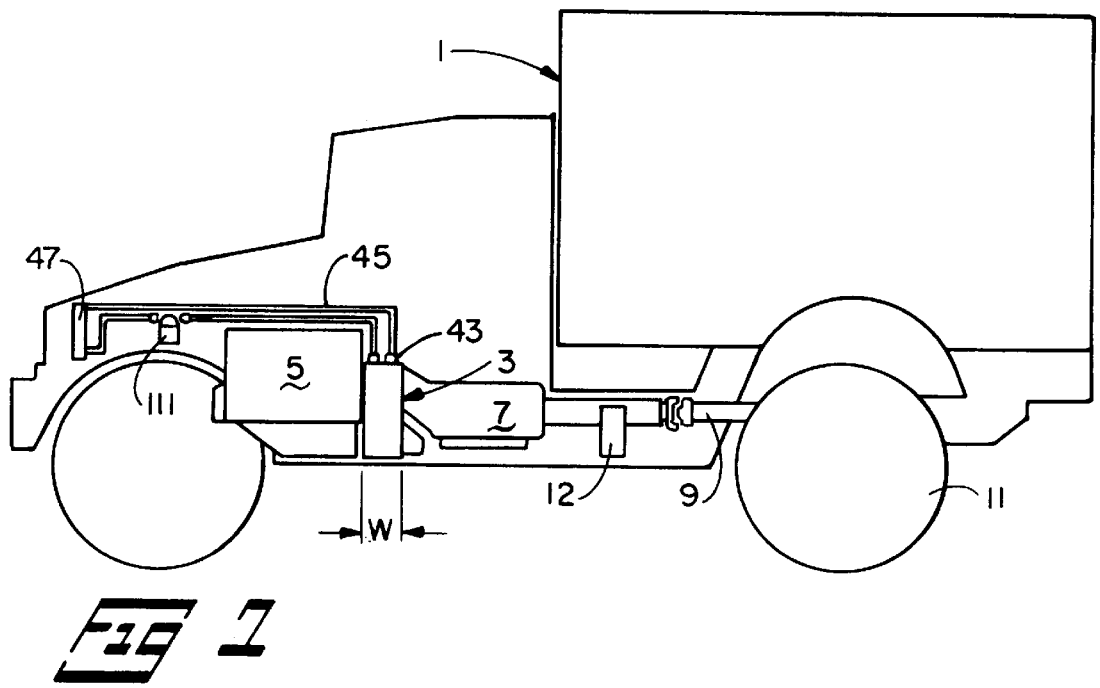
FIG. 1 is a schematic diagram of a typical motor vehicle that advantageously employs the present invention.
Figure 3:
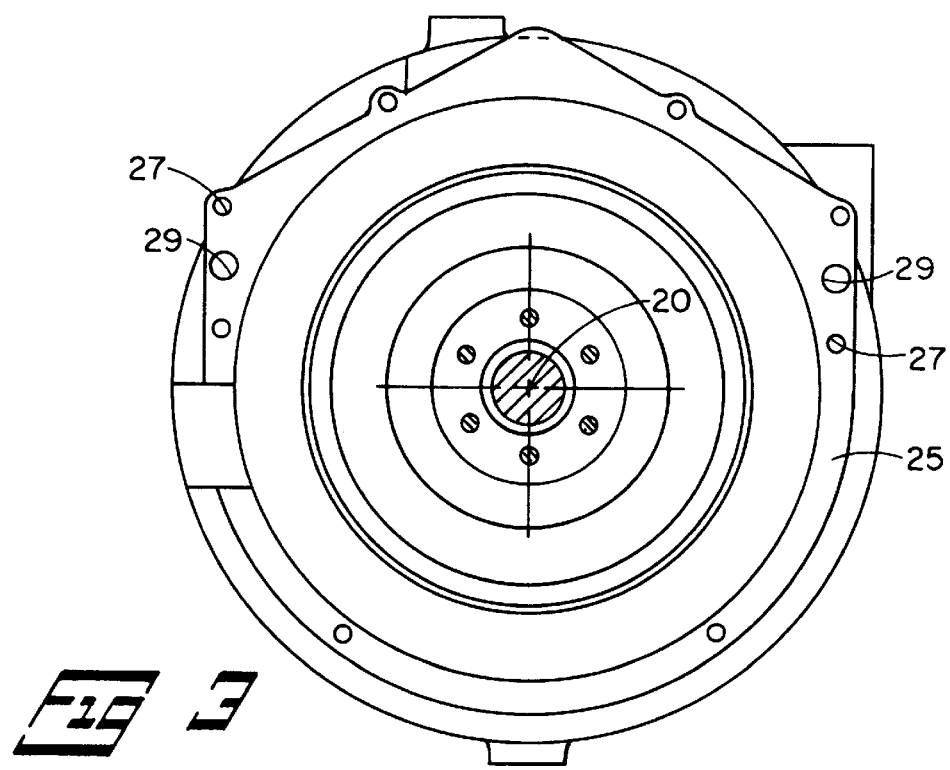
FIG. 3 is a cross-sectional view taken along line 3—3 of FIG. 2.
Figure 2:
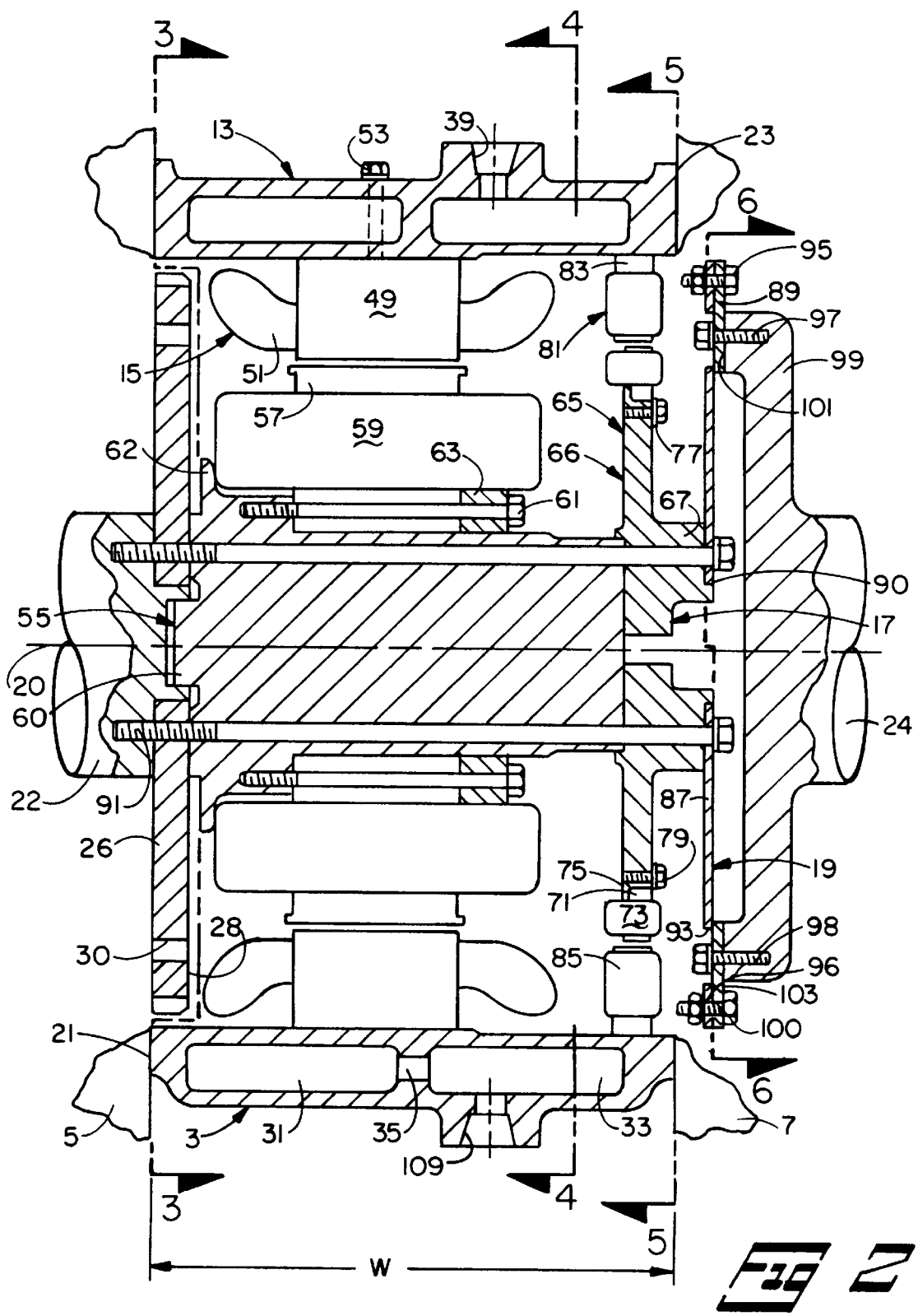
FIG. 2 is a longitudinal cross-sectional view through the in-line generator of the invention.

Referring first to FIG. 1, a motor vehicle 1 is illustrated that advantageously includes the in-line generator 3 of the invention. The particular motor vehicle 1 illustrated is a military truck commonly known as a heavy mobility multi-purpose wheeled vehicle. However, it will be understood that the particular motor vehicle illustrated is merely representative of a wide variety of vehicles with which the in-line generator 3 can be used. That is, the invention is not limited to use with any particular type of vehicle. The only requirement of the vehicle is that it have an engine 5 and a transmission 7 that is normally secured to the engine. Typically, the weight of the transmission 7 is partially supported on the vehicle chassis by a bracket 12. The vehicle also has a drive shaft 9 leading from the transmission to the vehicle drive wheels 11.

General

In accordance with the present invention, the inline generator 3 fits between the motor vehicle engine 5 and the transmission 7. No structural changes are necessary to either the engine or the transmission when the in-line generator is used. Specifically, as will be explained, the in-line generator is mounted to the engine in the same manner that the transmission normally mounts to the engine. Further, the transmission is secured to the in-line generator in the same way the transmission is normally secured to the engine.

Construction

Looking also at FIGS. 2–5, the in-line generator 3 is comprised of a housing 13, a stator 15, a rotor 17, and a coupling 19. The housing 13 has an engine end 21 and a transmission end 23. The housing is mounted between the engine and the transmission 7 such that the common longitudinal axis 20 of the housing 13, stator 15, rotor 17, and coupling 19 is concentric with the longitudinal axes of the engine crankshaft 22 and of the transmission input shaft 24. Reference numeral 26 is a flywheel for the engine. The flywheel 26 has an outside surface 28 and a number of circumferentially spaced through holes 30.

To maintain minimum weight, many of the components of the in-line generator 3 are made of aluminum. The housing 13, for example, is made as an aluminum casting. In keeping with the criterion of minimum size of the in-line generator consistent with generator capacity, the distance W between the housing engine end 21 and transmission end 23 is made as short as possible.

The housing engine end 21 has a flat surface 25 that is in facing contact with the engine 5 in a manner so as to be interchangeable with the transmission 7 on the engine. For the particular engine illustrated, there are six mounting holes 27 and two pin holes 29 in the surface 25. The holes 27 and 29 are in the identical relative locations as similar holes in the transmission. Therefore, the holes 27 and 29 align with corresponding holes on the engine 5. The holes 27 receive screws, not shown, that mount the housing to the engine. The holes 29 receive pins that accurately locate the housing on the engine such that the housing axis 20 is concentric with the crankshaft axis.

The transmission end 23 of the housing 13 has a flat surface 32, tapped mounting holes 27', and pin holes 29'. The holes 27' and 29' are in the same relative locations as the holes 27 and 29, respectively, in the housing engine end surface 25. Screws and pins, not shown, secure the transmission 7 to the housing such that the housing common axis 20 is concentric with the axis of the transmission input shaft 24. In that manner, the housing can be installed between the engine and transmission without making any alterations to either the engine or the transmission.

An important aspect of the invention is that it contains its own cooling system. For that purpose, the housing 13 is designed with a pair of circumferential cooling passages 31 and 33 that are connected by several cross passages 35. Ports 37 and 39 receive fittings 43 that connect with hoses 45 (FIG. 1). The hoses 45 lead to a radiator 47 near the front of the motor vehicle 1. Port 109 is a drain, and it is normally plugged.

The stator 15 is comprised of a number of steel laminations 49 and stator windings 51. The stator is assembled to the housing 13 with an interference fit. For that purpose, the housing is heated, the laminations 49 are cooled, and the laminations are slipped into the housing. After cooling, the laminations remain firmly in place during generator operation. To assure that the stator does not shift during transportation of the in-line generator 3 from the factory to the motor vehicle 1, a screw 53 may be inserted through the housing wall to bear against the laminations.

Further-in accordance with the present invention, the rotor 17 is not supported by any bearings. Rather, the rotor is fastened to and supported by both the engine crankshaft 22 and the transmission input shaft 24 in a manner that eliminates the need for any bearings. The rotor is made up of a shaft 55, rotor laminations 57, and rotor windings 59. To guide the rotor on the engine crankshaft, the rotor shaft 55 has a pilot 60 that fits snugly inside a corresponding bore in the engine crankshaft. There is an annular flange 62 on the rotor shaft proximate the pilot 60. The laminations 57 and windings 59 are retained on the shaft 55 by a number of screws 61. Preferably, a spacer 63 is used with the screws 61 to retain the rotor laminations and windings on the shaft. The spacer 63 is fit such that there is a light but intimate contact between the shaft flange 62 and the rotor windings 59.

In the preferred embodiment, the rotor windings 59 are electrically excited by an external source of DC voltage through an exciter 65. The exciter 65 includes an exciter rotor 66 having a hub 67 that pilots on and is attached to the rotor shaft 55. The exciter rotor 66 also includes exciter rotor laminations 71 and associated windings 73. The exciter rotor laminations 71 are clamped between an annular flange 75 on the hub 67 and a number of washers 77 held in place on the hub by associated screws 79. Wires, not illustrated in the drawings, lead from the exciter windings 73 to the rotor windings 59.

The exciter 65 further comprises an exciter stator 81. In turn, the exciter stator 81 is composed of a stack of steel exciter stator laminations 83 and windings 85. The exciter stator laminations 83 are press fit into the housing 13 in the same manner as the stator laminations 49.

The coupling 19 is composed of a flex plate 87 and an adapter plate 89. The flex plate 87 has an internal diameter that fits over a shoulder 90 on the exciter hub 67. The flex plate has a number of through holes 93 on a bolt circle near the flex plate outer diameter. Also see FIG. 6. The bolt circle of the holes 93 is the same as the bolt circle of the flywheel holes 30. Long screws 91 pass longitudinally through the flex plate, exciter hub 67, rotor shaft, and flywheel 26 and thread into the end of the crankshaft 22. Accordingly, the four foregoing components, as well as the rotor laminations 57 and windings 59, and the exciter rotor laminations 71 and windings 73, rotate as a unit with the crankshaft.

The adapter plate 89 of the coupling 19 has an outer diameter that is approximately the same as the flex plate outer diameter. Preferably, the adapter plate covers the holes 93 in the flex plate 87. The flex plate and adapter plate 89 are removably joined to each other by bolts and nuts 95 that pass through aligned clearance holes 96, 100 in the flex plate and adapter plate, respectively.

The transmission input shaft 24 is connected to the coupling 19. That is achieved by a number of screws 97 that pass through respective clearance holes 93 in the adapter plate 89. The screws 97 engage threaded holes 98 in an end face 101 of an annular flange 99 of the transmission input shaft. The holes 98 in the transmission input shaft annular flange 99 are on the same bolt circle as the through holes 30 in the flywheel Installation and Operation In the normal motor vehicle 1, the transmission 7 is mounted directly to the engine 5. The end face 101 of the transmission input shaft flange 99 is flush against the outside surface 28 of the flywheel 26. Screws similar to the screws 97 pass through the flywheel holes 30 and engage the threaded holes 98 in the transmission input shaft 99 to connect the transmission input shaft to the flywheel.

To install the in-line generator 3 in the motor vehicle 1, the drive shaft 9 and transmission bracket 12 are removed. The screws connecting the engine flywheel 26 to the transmission input shaft 24 are removed one at a time through an opening in the bottom of the transmission casing near the engine. Then the transmission 7 is disconnected from the engine 5 and set aside temporarily. The rotor 17 is guided on the engine crankshaft 22 by inserting the rotor shaft pilot 60 into the crankshaft bore. Two long studs, not shown, temporarily take the place of the screws 91 to hold the rotor in place. The housing 13 with the stator 15 and exciter stator 81 is mounted to the engine. Screws, not shown, are inserted through the holes 27 in the housing end 21 and into aligned tapped holes in the engine 5. Pins in the housing holes 29 align with corresponding pin holes in the engine to accurately locate the housing relative to the engine. After the housing 13 is firmly mounted to the engine 5, the temporary long studs are withdrawn from the rotor shaft 55. The exciter rotor 66 and the flex plate 87 are attached to the rotor shaft simultaneously with fastening the rotor shaft to the engine crankshaft 22 by the long screws 91.

The adapter plate 89 is put on the transmission input shaft 24 with the screws 97. The transmission 7 is then lifted and secured to the housing 13. Screws, not illustrated in the drawings, pass through the transmission and thread into the housing tapped holes 27'. Pins in the transmission align with corresponding pin holes 29' in the housing to accurately locate the transmission relative to the housing and thus also to the engine 5. When the transmission is secured to the housing, the surface 103 of the adapter plate 89 is in the same location relative to the face 101 on the transmission input shaft flange 99 as was the flywheel surface 28 when the transmission was mounted directly to the engine. As a result, no changes of any kind are required to the transmission input shaft or any other transmission components due to the installation of the in-line generator 3.

The final assembly step is to join the flex plate 87 and the adapter plate 89 to each other. That is achieved by indexing those plates to consecutively expose the pairs of holes 96, 100 one at a time through the opening in the transmission casing. The bolts and nuts 95 are assembled through the coupling holes 96, 100 as the flex plate and adapter plate are indexed. A cover, not shown, is used to cover the opening in the transmission casing after all the bolts and nuts 95 have been assembled. All the foregoing installation steps can be conveniently performed from under the motor vehicle 1. After complete installation of the in-line generator 3, the motor vehicle engine 5 is set by a governor to operate at a predetermined constant speed to produce electric power at the desired frequency and voltage.

As mentioned, the present invention is also concerned with keeping the in-line generator 3 cool. As one way of accomplishing that result, an ethyl glycol coolant is filled into the interior passages 31, 33, 35 in the housing 13. A small pump 111 is driven by the vehicle engine 5 to provide circulation for the coolant through the ports 39 and 41, fittings 43, and hose 45 to the radiator 47, FIG. 1.

The in-line generator 3 is further cooled by conducting heat from the rotor windings 59 to the rotor shaft 55 and then dissipating the heat from the shaft. Returning to FIG. 2, the rotor windings 59 are in intimate contact with the rotor shaft at the flange 62. Consequently, the rotor shaft acts as a heat sink for the windings. The rotor shaft, through contact with the engine crankshaft 22 and the exciter hub 67, dissipates heat to the atmosphere. Any increase in temperature within the in-line generator 3 that does occur does not cause a problem due to radial expansion of the various components. For example, the stator laminations 49, as well as the exciter laminations 83, have sufficient interference fits with the housing 13 that they do not loosen because of any temperature rises. Any axial expansion of the rotor shaft 55 is accommodated by the flex plate 87, which is able to diaphragm. Consequently, only minimal thermal stresses are imposed on the engine crankshaft 22 and transmission input shaft 24 by the in-line generator.

When the motor vehicle 1 is moving, the rotor shaft 55 transmits torque for two purposes. First, the torque is used to transmit mechanical power from the engine 5 to the transmission 7. The rotor shaft thus acts as a mechanical link between the engine crankshaft and the transmission input shaft, and it rotates at the same variable speeds as the engine crankshaft and the transmission input shaft. Second, the torque in the rotor shaft enables the rotor 17 to cooperate with the stator 15 to produce AC output from the in-line generator 3.

Pursuant to the invention, a failure of the in-line generator 3 does not render the motor vehicle 1 useless. Rather, either of two courses of action is easily accomplished to keep the vehicle in operation. The first is to remove the transmission 7 from the housing 13, remove the housing and rotor 17 from the engine 5, and then resecure the transmission to the engine 5. Upon reattaching the transmission input shaft 24 to the flywheel 26 and replacing the original drive shaft 9, the motor vehicle is again ready for normal operation.

The second course of action is to replace the faulty in-line generator 3 with a dummy generator. The transmission 7 is removed from the housing 13, and the housing and rotor 17 are removed from the engine 5. A dummy shaft and coupling, not shown, having the same lengths and mounting patterns as the rotor shaft 55 and coupling 19 are used, together with a dummy housing that is mounted to the engine. The transmission is secured to the dummy housing. The dummy generator can be used in the motor vehicle 1 until the in-line generator is repaired.

An example of an in-line generator that works very well is as follows. The housing 13 has a length W of 10.23 inches and an outer diameter of approximately 17.25 inches. The in-line generator is a six pole generator designed to produce ten killowats at an engine speed of 1,200 rpm. The entire inline generator adds only about 100 pounds to the total weight of the vehicle 1.

In summary, the results and advantages of motor vehicles and other engine-driven conveyances can now be more fully realized. The in-line generator 3 provides both a compact source of considerable electric power as well as the convenience of always having the power available with the vehicle itself. This desirable result comes from using the combined functions of the housing 13 and the rotor 17. The housing supports the generator stator 15 and also the exciter stator 81. The housing also acts as a mechanical support for the transmission 7 in the same manner as the engine provides support for the transmission when the in-line generator is not present. The rotor is interposed between the engine crankshaft 22 and the transmission input shaft 24 without using any bearings. The rotor is excited by an external exciter. The coupling 19 attaches to both the rotor and the transmission input shaft. In that manner, the rotor and transmission input shaft rotate at the same speed as the engine crankshaft. The rotor both drives the transmission and enables the in-line generator to produce electric power. The in-line generator is cooled by a liquid-to-air heat exchanger, and by a combination of conduction and convection inside the housing. The coupling and stators are designed to accommodate any thermal expansions that do occur. The in-line generator can be installed from underneath the vehicle without any modifications to either the engine or the transmission. A dummy generator can be substituted, if desired, should the in-line generator fail, thereby contributing to the versatility and value of the invention.

It will also be recognized that in addition to the superior performance of the in-line generator 3, its construction is such as to be of moderate cost in relation to the benefits it provides. Also, since it is made of a simple design and with rugged components, it will give many years of satisfactory service with minimal maintenance.

Thus, it is apparent that there has been provided, in accordance with the invention, a vehicle in-line generator that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An in-line generator comprising:
    a. a housing having a first end defining a first plane that is mountable to a motor vehicle engine having a crankshaft, and a second end defining a second plane parallel to the first plane that is securable to a motor vehicle transmission having a transmission input shaft;
    b. a stator in the housing;
    c. a rotor comprising:
        i. a rotor shaft having a first end that is fastenable to the engine crankshaft, a second end, and a cylindrical portion between the first and second ends; and
        ii. rotor windings and laminations surrounding and retained on the rotor shaft cylindrical portion;
    d. means for attaching the rotor shaft to the transmission input shaft; and
    e. means for exciting the rotor windings such that the rotor windings cooperate with the stator and the means for exciting the rotor windings to produce electric power and to transmit torque to the transmission input shaft when the housing is installed between a motor vehicle engine and transmission and the rotor is rotated by the vehicle crankshaft, wherein the means for attaching the rotor shaft to the transmission input shaft comprises:
        i. a coupling located solely between the means for exciting the rotor windings and the transmission input shaft;
        ii. means for attaching the coupling to the rotor shaft; and
        iii. means for attaching the coupling to the transmission input shaft, wherein:
    the coupling comprises a thin generally planar flex plate located solely in a plane parallel to the second plane with the second plane being between the first plane and the flex plate, an adapter plate, and means for removably joining the flex plate to the adapter plate;
    the means for attaching the coupling to the rotor shaft comprises first fasteners that attach the flex plate to the means for exciting the rotor windings; and
    the means for attaching the coupling to the transmission input shaft comprises second fasteners that attach the adapter plate to the transmission input shaft.

2. The in-line generator of claim 1 wherein the flex plate diaphragms in directions perpendicular to the first and second planes during operation of the in-line generator to thereby accommodate thermal expansions of the rotor and thereby minimize thermal stresses on the crankshaft and transmission input shaft.

3. An in-line generator comprising:
    a. a housing having a first end defining a first plane that is mountable to a motor vehicle engine having a crankshaft, and a second end defining a second plane parallel to the first plane that is securable to a motor vehicle transmission having a transmission input shaft;
    b. a stator in the housing;
    c. a rotor comprising:
        i. a rotor shaft having a first end that is fastenable to the engine crankshaft, a second end, and a cylindrical portion between the first and second ends; and
        ii. rotor windings and laminations surrounding and retained on the rotor shaft cylindrical portion;
    d. means for attaching the rotor shaft to the transmission input shaft; and
    e. means for exciting the rotor windings such that the rotor windings cooperate with the stator and the means for exciting the rotor windings to produce electric power and to transmit torque to the transmission input shaft when the housing is installed between a motor vehicle engine and transmission and the rotor is rotated by the vehicle crankshaft, wherein:
        i. the means for exciting the rotor windings comprises an exciter stator in the housing, and an exciter rotor on the rotor shaft; and
        ii. the means for attaching the rotor shaft to the transmission input shaft comprises:

a coupling;
  at least one fastener that simultaneously attaches the coupling, rotor shaft, and exciter rotor to the engine crankshaft; and
  means for attaching the coupling to the transmission input shaft.

4. An in-line generator comprising:
a. a housing having a first end defining a first plane that is mountable to a motor vehicle engine having a crankshaft, and a second end defining a second plane parallel to the first plane that is securable to a motor vehicle transmission having a transmission input shaft;
b. a stator in the housing;
c. a rotor comprising:
  i. a rotor shaft having a first end that is fastenable to the engine crankshaft, a second end, and a cylindrical portion between the first and second ends; and
  ii. rotor windings and laminations surrounding and retained on the rotor shaft cylindrical portion:
d. means for attaching the rotor shaft to the transmission input shaft; and
e. means for exciting the rotor windings such that the rotor windings cooperate with the stator and the means for exciting the rotor windings to produce electric power and to transmit torque to the transmission input shaft when the housing is installed between a motor vehicle engine and transmission and the rotor is rotated by the vehicle crankshaft, wherein the means for exciting the rotor windings comprises:
  i. an exciter stator in the housing; and
  ii. an exciter rotor located between the means for attaching the rotor shaft to the transmission input shaft and the first plane comprising:
    an exciter hub on the rotor shaft and having an annular flange;
    exciter rotor laminations and windings on the exciter hub; and
    at least one fastener that clamps the exciter rotor laminations against the exciter hub annular flange, wherein the means for attaching the rotor shaft to the transmission input shaft comprises:
  a generally flat flex plate that lies in a plane parallel to the second plane with the second plane being between the first plane and the plane of the flex plate, an adapter plate, and means for removeably joining the flex plate to the adapter plate;
  at least one fastener that simultaneously fastens the rotor shaft, exciter hub, and flex plate to the engine crankshaft; and
  means for attaching the adapter plate to the transmission input shaft.

5. A bearingless generator comprising:
a. a housing mounted to and between first and second stationary members and defining a housing longitudinal axis;
b. a stator in the housing;
c. a rotor having a first end fastened to a first shaft rotatable in the first stationary member, and a second end, the rotor being free of any bearing support inside the housing, wherein the rotor comprises:
  i. a rotor shaft having a first end and a second end and the cylindrical Portion between the first and second ends; and
  ii. rotor laminations and windings surrounding the rotor shaft cylindrical portion that cooperate with the stator to produce electric power when the rotor shaft rotates; and
d. means for attaching the rotor second end to a second shaft rotatable in the second stationary member, the rotor being supported solely by and between the first and second shafts and rotating therewith to provide electric power in cooperation with the stator, wherein the means for attaching the rotor second end to the second shaft comprises:
  i. a coupling;
  ii. at least one fastener that simultaneously attaches the coupling and the rotor shaft to the first shaft; and
  iii. means for attaching the coupling to the second shaft, wherein the coupling comprises:
  a thin generally flat flex plate lying in a plane perpendicular to the housing longitudinal axis, the flex plate being attached to the rotor shaft by said at least one fastener that simultaneously attaches the coupling and the rotor shaft to the first shaft;
  an adapter plate attached to the second shaft by the means for attaching the coupling to the second shaft; and
  means for removeably joining the flex plate to the adapter plate.

6. The bearingless generator of claim 5 wherein:
a. the rotor windings are electrically excited by an exciter rotor and an exciter stator; and
b. said at least one fastener that simultaneously attaches the coupling and the rotor shaft to the first shaft simultaneously attaches the flex plate, exciter rotor, and rotor shaft to the first shaft.

7. In combination with a motor vehicle having an engine with a crankshaft that defines a longitudinal axis and a flywheel that rotates with the crankshaft; a transmission having an input shaft that defines a longitudinal axis; and a drive shaft that transmits power from the transmission to vehicle drive wheels,
a generator comprising:
a. a housing mounted to and between the engine and the transmission and having a housing longitudinal axis that is generally concentric with the longitudinal axes of the engine crankshaft and the transmission input shaft;
b. a stator in the housing;
c. a rotor fastened to the engine crankshaft;
d. a coupling attached to the rotor and to the transmission input shaft, wherein the coupling comprises:
  i. a thin flat flex plate having a predetermined outer diameter and lying solely in a plane generally perpendicular to the housing longitudinal axis and attached to the rotor;
  ii. an adapter plate having an outer diameter substantially equal to the predetermined outer diameter and attached to the transmission input shaft; and
  iii. means for removably joining the thin flat flex plate to the adapter plate.

8. The combination of claim 7 wherein:
a. the rotor comprises:
  i. rotor shaft;
  ii. generator rotor windings and laminations retained on and surrounding a portion of the rotor shaft;
  iii. an exciter rotor on the rotor shaft;
  iv. exciter laminations and windings on the exciter rotor; and
  v. at least one fastener that simultaneously fastens the flex plate, exciter rotor, and rotor shaft to the engine crankshaft; and
b. an exciter stator in the housing that cooperates with the exciter rotor to excite the generator rotor windings.

9. The combination of claim 8 wherein the rotor shaft is formed with an annular flange that is in intimate contact with the generator rotor windings, the annular flange acting as a heat sink to dissipate heat from the rotor windings when the generator is producing electric power.

10. The combination of claim 7 wherein the thin flat flex plate diaphragms in directions parallel to the housing longitudinal axis to accommodate any thermal expansion of the generator and thereby minimize thermal stresses on the crankshaft and transmission input shaft while the generator is producing electric power.

11. The combination of claim 7 wherein the generator housing is mountable on the engine interchangeably with the transmission, and wherein the transmission is interchangeably securable to the housing or to the engine.

12. The combination of claim wherein:
   a. the housing has a first end mounted to the engine and a second end secured to the transmission;
   b. the engine flywheel has an outside surface that lies in a plane perpendicular to the longitudinal axis of the crankshaft and is a predetermined distance from the housing first end; and
   c. the transmission input shaft has a face that lies in a plane perpendicular to the longitudinal axis of the crankshaft and is located at the predetermined distance from the housing second end, so that the generator is removable from the motor vehicle, the transmission is securable to the engine, and the transmission input shaft is connectable to the flywheel outside surface for rotating therewith without altering the engine, transmission, flywheel, or transmission input shaft.

13. The combination of claim 7 wherein the generator is free of any bearings between the engine and the transmission.

* * * * *